United States Patent [19]
Psinakis et al.

[11] Patent Number: 5,532,939
[45] Date of Patent: Jul. 2, 1996

[54] METHOD AND APPARATUS FOR DATA COMMUNICATION EFFICIENCY ANALYSIS

[75] Inventors: Leas N. Psinakis, Basking Ridge, N.J.; Thomas J. Villani, Bethlehem, Pa.; August C. Etsch, Nanuet, N.Y.

[73] Assignee: AT&T Global Information Solutions Company, Dayton, Ohio

[21] Appl. No.: 280,891

[22] Filed: Jul. 27, 1994

[51] Int. Cl.$^6$ .................................................. H04J 15/00
[52] U.S. Cl. ...................... 364/514 C; 370/118; 379/111
[58] Field of Search ........................... 364/514 A, 514 B, 364/514 C, 514 R; 370/118; 379/111

[56] References Cited

U.S. PATENT DOCUMENTS

| | | | |
|---|---|---|---|
| 4,996,685 | 2/1991 | Farese et al. | 370/58.1 |
| 5,095,445 | 3/1992 | Sekiguchi | 364/514 |
| 5,163,042 | 11/1992 | Ochiai | 370/17 |
| 5,187,710 | 2/1993 | Chav et al. | 370/110.1 |
| 5,233,628 | 8/1993 | Rappaport et al. | 375/10 |
| 5,249,218 | 9/1993 | Sainton | 379/59 |
| 5,274,643 | 12/1993 | Fisk et al. | 370/94.1 |
| 5,276,679 | 1/1994 | McKay et al. | 370/84 |
| 5,289,536 | 2/1994 | Hokari | 379/221 |
| 5,303,297 | 4/1994 | Hillis | 379/63 |
| 5,317,566 | 5/1994 | Joshi | 370/60 |
| 5,367,522 | 11/1994 | Otani | 370/84 |
| 5,426,645 | 6/1995 | Haskin | 370/118 |
| 5,426,674 | 6/1995 | Nemirovsky et al. | 395/200 |
| 5,428,671 | 6/1995 | Dykes et al. | 379/93 |
| 5,481,562 | 1/1996 | Pearson et al. | 375/222 |
| 5,497,339 | 3/1996 | Bernard | 364/705.05 |

FOREIGN PATENT DOCUMENTS

| | | |
|---|---|---|
| A0565229 | 10/1993 | European Pat. Off. . |
| WOA9411999 | 5/1994 | European Pat. Off. . |

*Primary Examiner*—Emanuel T. Voeltz
*Assistant Examiner*—Patrick J. Assouad
*Attorney, Agent, or Firm*—Paul J. Maginot

[57] ABSTRACT

A method and system for estimating the effectiveness and efficiency of a communication device is disclosed. The system includes a computer executing a communication efficiency program. The computer further includes a modem that is coupled to a plurality of transmission devices through a plurality of I/O ports. Prior to transmitting a selected data file through the modem to one of the transmission devices for subsequent transmission to a remote site, a user may evaluate information about the transmission of the selected data file through a transmission device such as the estimated cost and time of transmission for the data file. The program provides the estimates by using retrieved data file parameters for the selected data file and user defined data transmission parameters for the various transmission devices. The estimated cost and time are stored and the user may select another device for which the time and costs of transmission are estimated. The user may then alternatingly display the estimated cost and time for the transmission through the selected devices to evaluate the most time and cost efficient device for transmission of the file.

22 Claims, 8 Drawing Sheets

SCREEN FOR MODULE 30

FIG. 4

SCREEN FOR MODULE 32

SCREEN FOR MODULE 34

SCREEN FOR MODULE 38

METHOD AND APPARATUS FOR DATA COMMUNICATION EFFICIENCY ANALYSIS

FIELD OF THE INVENTION

This invention relates to computer programs used to communicate data files to a remote site. More particularly, the present invention is directed to data communications from a portable computer to a remote site.

BACKGROUND OF THE INVENTION

Communication programs for controlling the transmission of data files from a computer, including portable computers, are known. These programs typically retrieve selected files and control a communication interface to transmit the selected file to a remote site. These programs may also be activated to receive data transmitted from a remote site to the computer. In that event, the communication program assembles the transmitted data into a file for use and storage within the computer. Typically, these programs communicate and control the interface for receipt and transmission of the data and may detect and correct errors in the communicated data.

Many computers are capable of communicating data in a variety of communication modes. For example, a computer may communicate data through a public switched telephone network (PSTN), sometimes called land lines, or some wireless communication device such as a packet radio or a cellular telephone. To perform the communication, the communication network or devices may be coupled to the computer through input/output (I/O) ports or other communication interface circuitry associated with the computer. The user uses a communication program to select one of the communication devices coupled to the computer. The program controls the communication interface to communicate the data through the I/O port or interface and the selected communication device to the remote site. While the programs previously known are capable of supporting more than one communication device, they are not capable of evaluating the most efficient device for transmitting data. What is needed is a program that assists a user in evaluating which device transmits the data in the most cost or time efficient manner.

SUMMARY OF THE INVENTION

In accordance with the principles of the present invention, a method is provided that facilitates the evaluation of multiple transmission devices for a particular data file. This inventive method includes selecting one of a plurality of data transmission devices, selecting a data file for transmission, determining information for transmitting the selected data file via the selected transmission device, and displaying the determined information whereby a user may evaluate whether to transmit the selected file through the selected device.

A program structured in accordance with the principles of the present invention may be spawned by a user through a computer operating system or from an application program running on the computer to provide the user with a transmission device evaluation capability. The program accepts information from the user to identify the data file for transmission and the transmission device that the user seeks to have evaluated. The program determines information such as an estimated cost and time for sending the selected file via the selected transmission device. The user may then select a second device and the program recomputes the information necessary to send the selected file by the second selected device. The user may then compare the information to transmit the file via the two devices to determine which is the most economical or time efficient.

The inventive program also permits the user to evaluate whether the computer has adequate resources for performing the transmission. For example, the battery power of the external transmission device and the portable computer may be displayed to permit the user to determine whether the computer or transmission device can remain powered for the time required to support the transmission. Other transmission device parameters may be displayed, such as signal strength, to assist the user in determining whether a particular device is adequate for the data transmission.

The inventive program may be executed in the background of a previously known communication program. In this mode, the program monitors the transmission of the data file controlled by the communication program and generates diagnostic information regarding the transmission. This diagnostic information includes a received signal strength indication, a signal-to-noise ratio, and the number of retransmission attempts made. A user viewing this diagnostic information may decide that the external device is not efficiently or effectively transmitting the file and terminate the data transmission in an effort to avoid unnecessary time and expense in repeatedly attempting to retransmit the data file.

One object of the present invention is to provide a user with an estimate of the expense and time necessary to transmit a selected file via a particular external transmission device. Another object of the present invention is to provide diagnostic information regarding the transmission of a data file through an external transmission device. Another object of the present invention is to provide a log of received and transmitted messages to the computer by monitoring the execution of the communication program. These and other objects and advantages of the present invention are apparent from the drawings and detailed description of the invention provided herein.

DESCRIPTION OF THE DRAWINGS

FIG. 4 is a depiction of a screen displayed in the preferred embodiment of the receive log module of a program that implements the method of the present invention;

DETAILED DESCRIPTION

Figure 1:
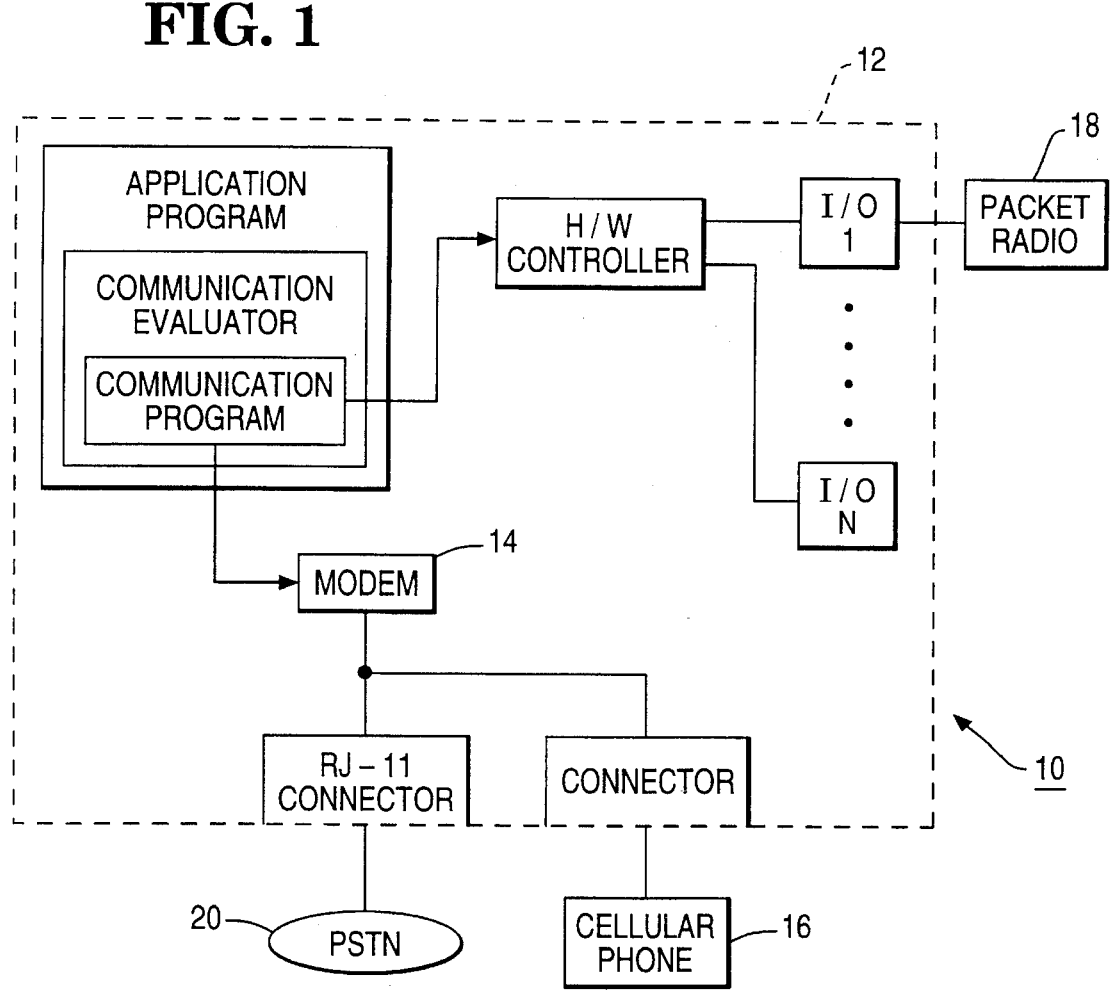
FIG. 1 is a block diagram of a system in which the method of the present invention is used.

A block diagram depicting a system 10 utilizing a program developed in accordance with the principles of the present invention is shown in FIG. 1. The system 10 includes a personal computer 12 which operates under the control of an operating system, such as MS-DOS or any other conventionally known operating system. The operating system in turn may execute a Microsoft® Windows program or other user interface program for providing application programs to a user.

The personal computer 12 further includes modem 14 for communicating with devices external of the personal computer 12. Computer 12 also communicates with external devices through a hardware interface controller for serial or parallel communication ports. Computer 12 may also include internal communication devices that are coupled to external devices through designated ports. Preferably the modem is a PCMCIA modem having a dual port RAM. In the most preferred embodiment, the PCMCIA modem 14 is a type II modem from AT&T Paradyne of Largo, Fla. The personal computer 12 communicates with the modem 14 of the preferred embodiment using a Hayes or AT command set. This command set is used to initialize the operating parameters for the modem, control the modem during its operation, and to interrogate the modem for status.

With further reference to FIG. 1, an application program executing on computer 12 may communicate through the modem 14 to a cellular phone 16 or a Public Switched Telephone Network 20. Alternatively, computer 12 may use an internal hardware interface controller to communicate through one of the I/O communication ports. For example, a packet radio 18 may be coupled to I/O communication port 1. Likewise, information communicated from modem 14 to cellular phone 16 is wirelessly transmitted to a receiver at a remote site.

Through the operating system or Windows program, a user may select a communications application program to communicate with the modem 14. This application program may be any of a variety of commercially available products such as Windows Access Plus available from AT&T Easylink Services of Parsippany, N.J. The communications program may also be a custom written application either by or for the user. The inventive communication evaluator program 22 (FIG. 2) may be initiated from an application or file manager program or directly through the operating system. The communication evaluator program 22 may invoke a communications application program to communicate with a transmission device through modem 14 or the hardware controller for one of the I/O communication ports.

Figure 2:
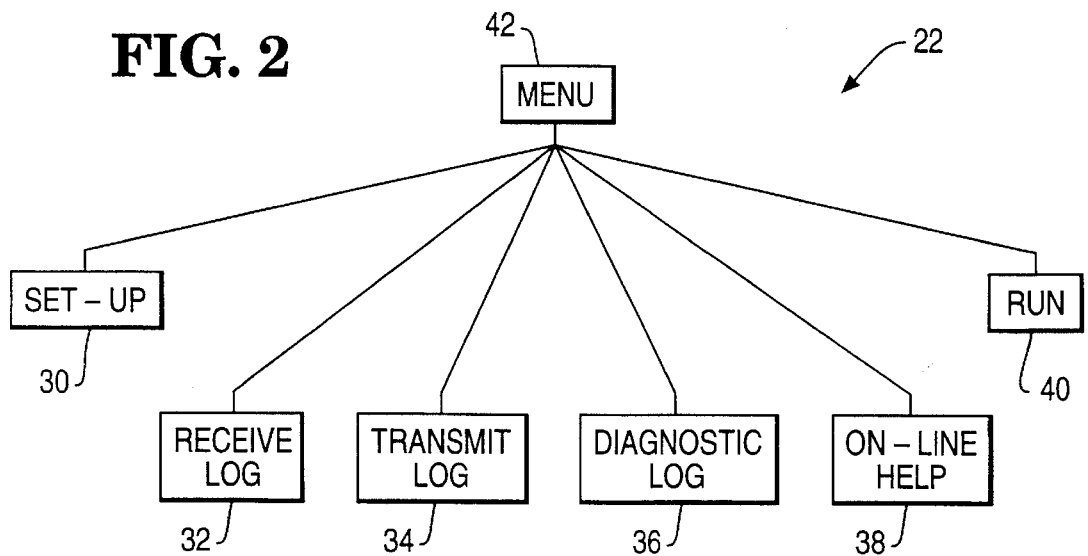
FIG. 2 is a block diagram showing the modules that comprise a preferred embodiment of a program that implements the method of the present invention.

The communication evaluator program 22 is comprised of six modules as shown in FIG. 2. These modules are denoted as the set-up 30, receive log 32, transmission log 34, communications diagnostics log 36, on-line help 38, and run 40 modules. Each of these modules performs a particular function for a user and are user selectable through the menu module 42. Each of the modules are discussed in detail below.

Figure 3:
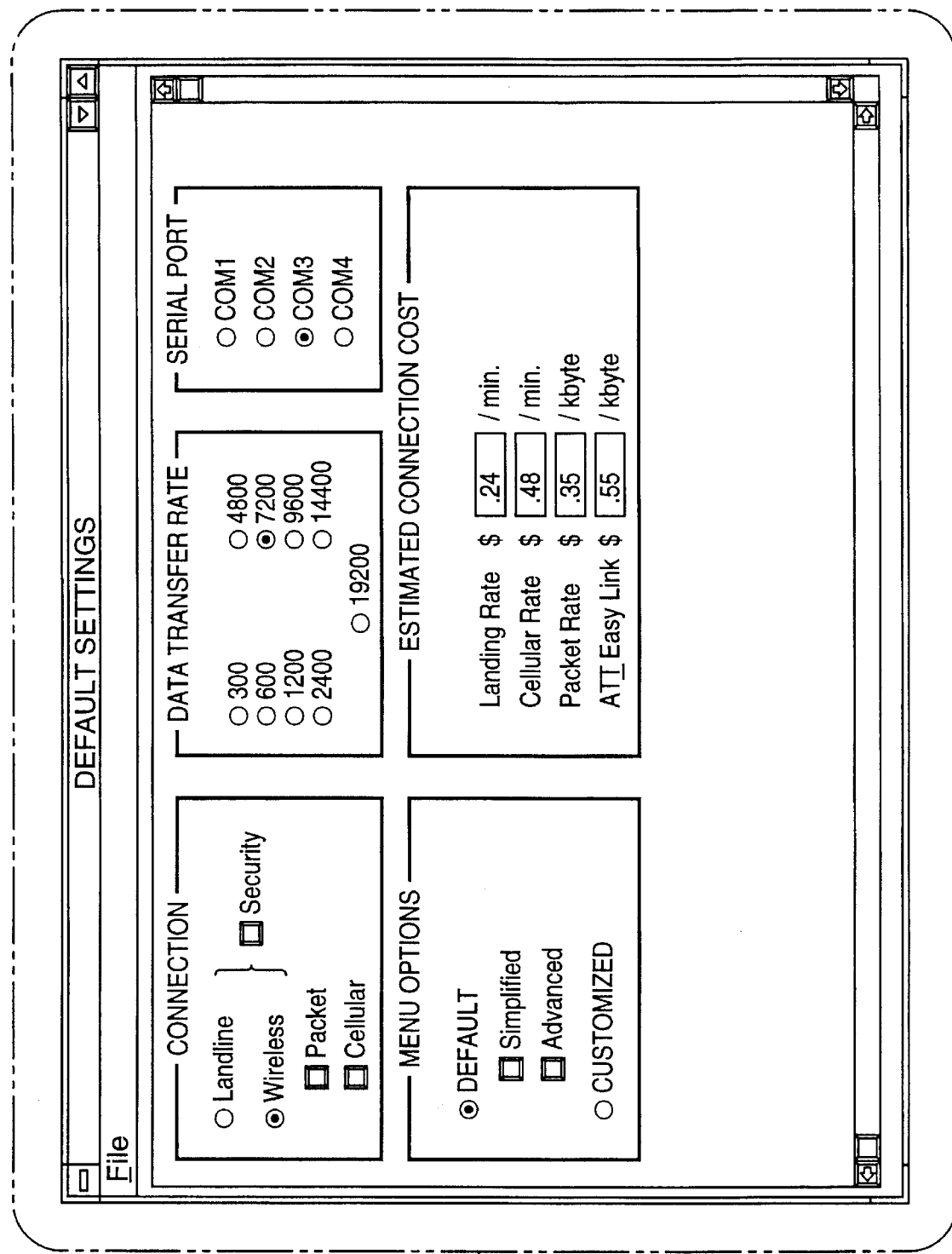
FIG. 3 is a depiction of a screen displayed in the preferred embodiment of the set-up module of a program that implements the method of the present invention.

The preferred screen menu for the set-up module 30 is shown in FIG. 3. This module is used by a user to initialize the default settings for the transmission devices to which the personal computer 12 is connected. The default data transfer rate for transmission through the selected transmission device and the estimated financial costs associated with each type of external transmission device which may be coupled to the personal computer are initialized through the execution of set-up module 30. The estimated connection costs entered by the user may be on a financial amount per unit of time basis or a financial amount per unit of data transmitted basis. The menu options function shown in FIG. 3 does not form a part of the present invention.

Figure 4:
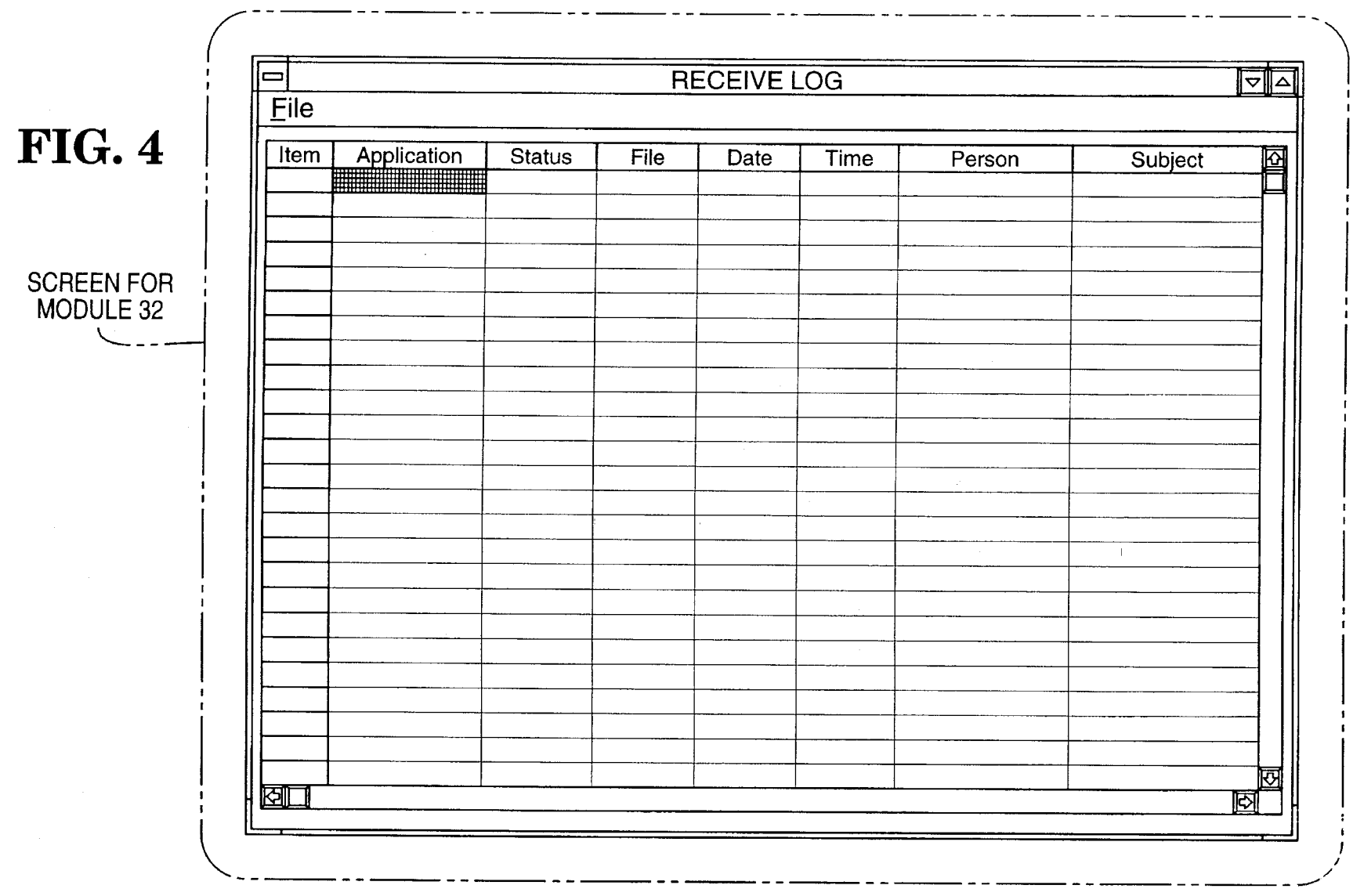

The screen displayed for the receive log module 32 of the preferred embodiment of the present invention is shown in FIG. 4. The receive log screen depicted there provides a history of data receptions for messages received by the personal computer 12. Each of the messages are recorded in a manner that identifies the sender of the message, the subject matter, file type in which the message is stored, the communication method used, and the date and time that the message was received. The user may also identify other information for each received message such as associated costs or billing codes for the message. The information depicted in the screen in FIG. 4 is representative and may include other data.

Figure 5:
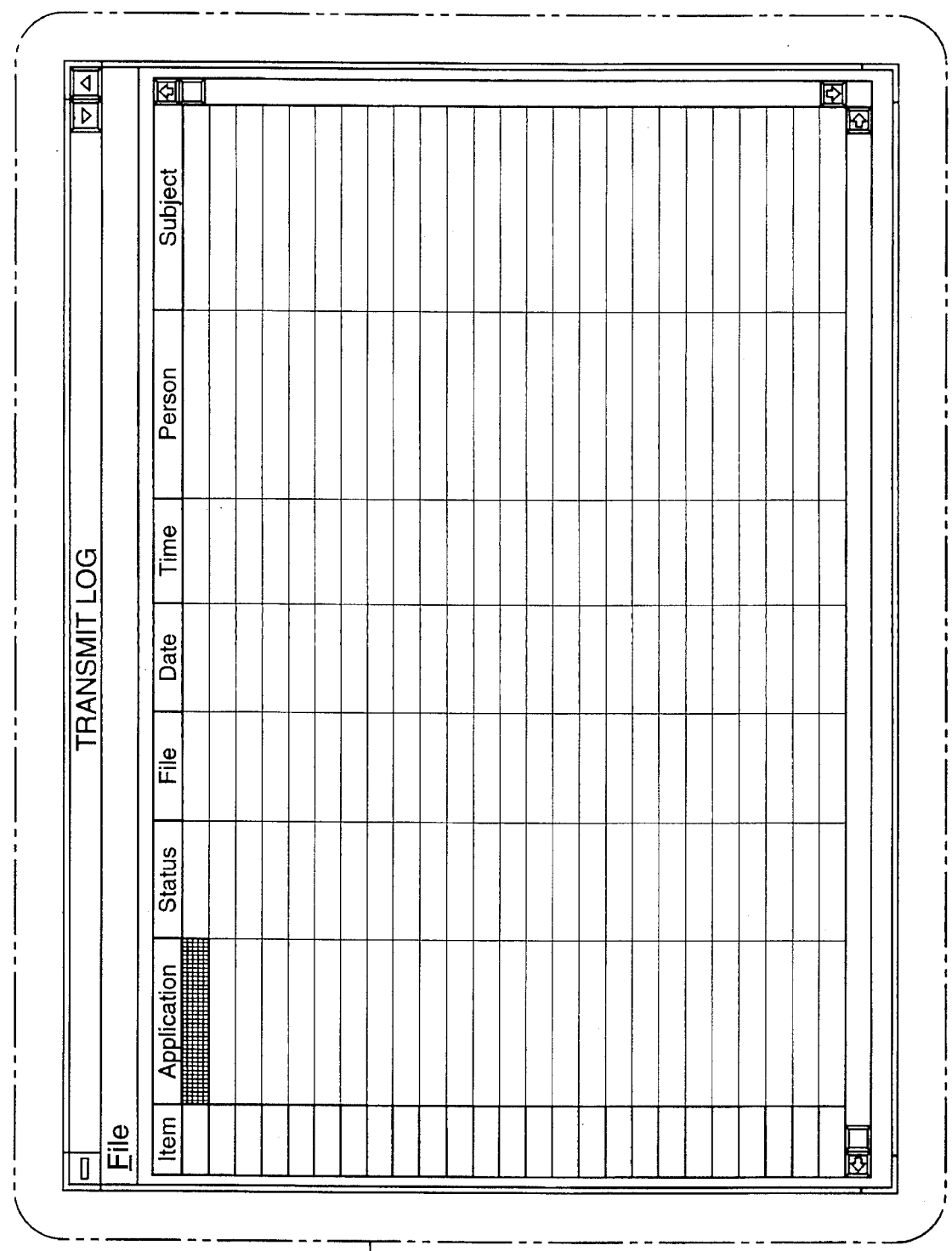
FIG. 5 is a depiction of a screen displayed in the preferred embodiment of the transmission log module of a program that implements the method of the present invention.

The screen associated with the transmit log module 34 of the preferred embodiment of the present invention is shown in FIG. 5. This log is used to record information regarding data messages transmitted by the personal computer 12 through the modem 14. This information includes the identification of the sender, the subject matter of the file transmitted, the file type transmitted, the communications method used, and the date and time of the data transmission. Additional comments such as associated costs or billing codes may be entered by the user in the log. The information depicted in the screen in FIG. 5 is representative and may include other data.

The communications diagnostic log module 36 generates and displays the communications set-up and communication parameters for a communication session in which the cost evaluator program was executed. The period of retention for this log is selectably determined by the user. By retrieving and reviewing the communications log of a prior communication session, a user may further consider parameters that indicate the effectiveness of a particular communication mode.

Each of the log modules 32, 34, and 36 are preferably implemented with an export function for formatting the data displayed in the log screens into an ASCII data file. This file may then be exported to a spread sheet or database application program for analysis. For example, the transmission log may be exported to a program that generates a report of an employee's communication usage for an expense report or the like.

Figure 6:
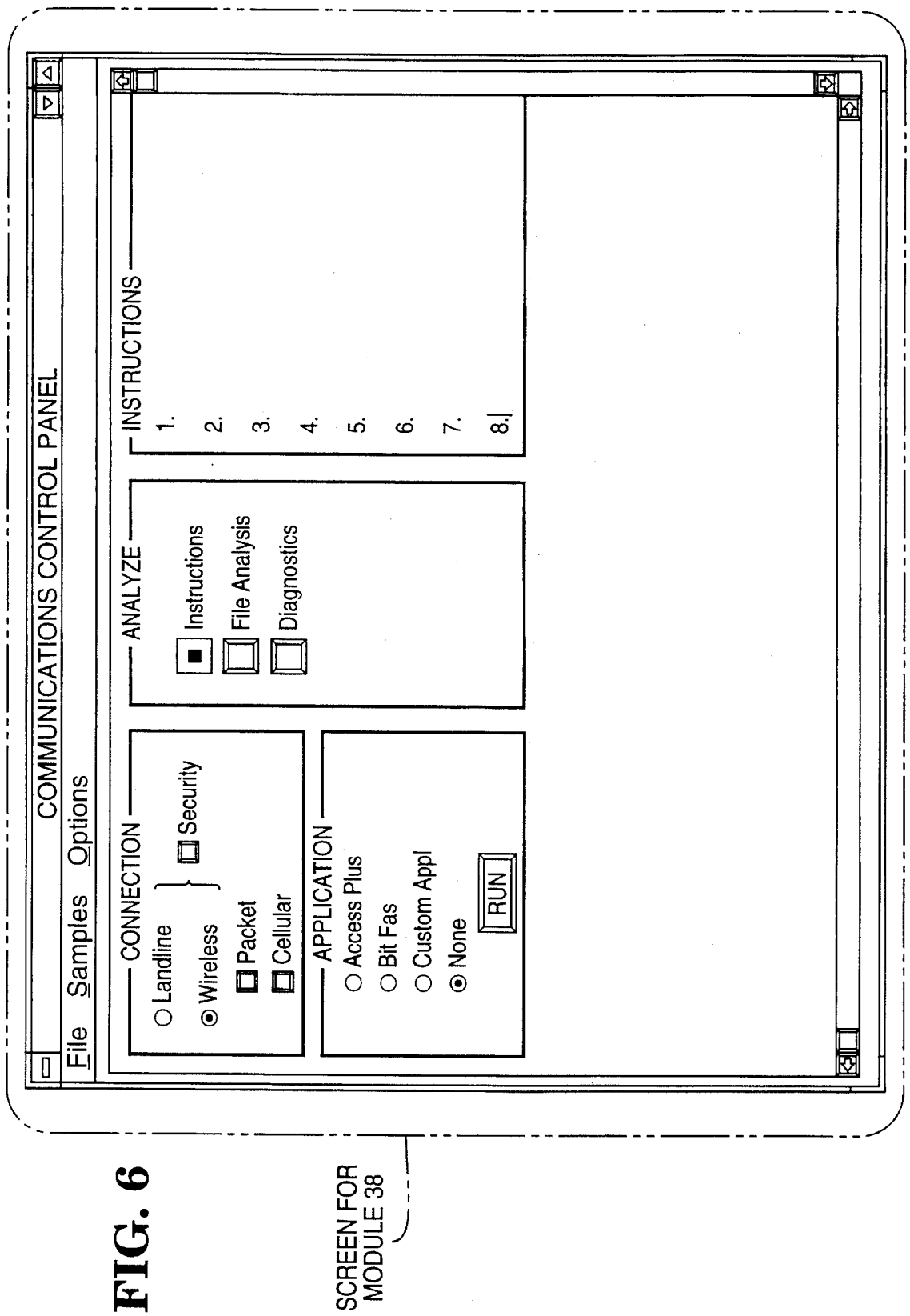
FIG. 6 is a depiction of a screen displayed in the preferred embodiment of the on-line help module of a program that implements the method of the present invention.

The screen associated with the on-line help module 38 of the preferred embodiment of the communication evaluator program 22 is shown in FIG. 6. This module will access help messages stored in files and display the messages in response to a user performing a mouse click on a screen displayed object. Other help messages will provide the user with suggestions for operating the communication hardware and information on optimizing data communications.

Figure 7:
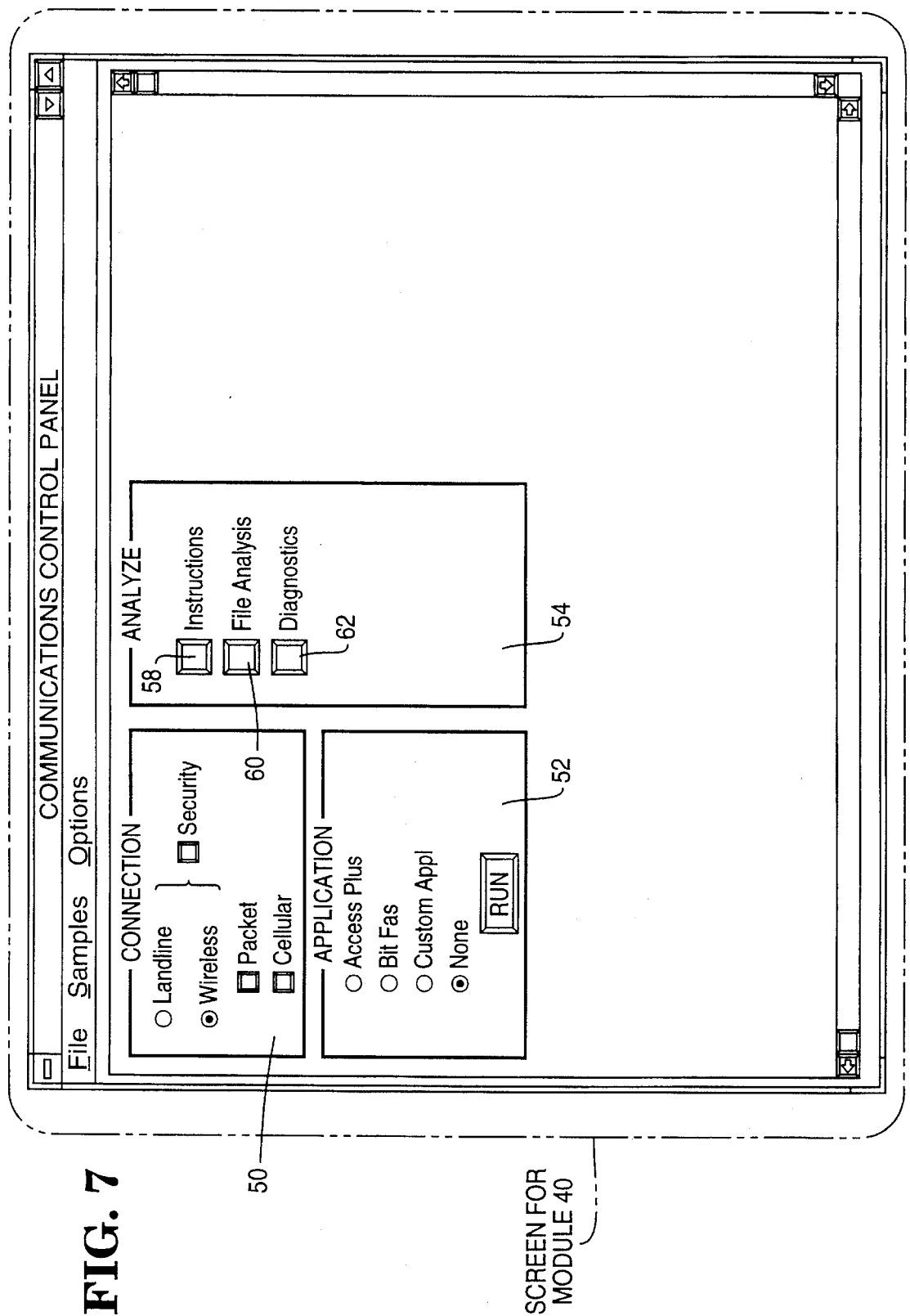
FIG. 7 is a depiction of a screen displayed in the preferred embodiment of the run module of a program that implements the method of the present invention.

The screen associated with the run module 40 of the preferred embodiment of the communication evaluator program 22 is shown in FIG. 7. The connection panel 50 and the application panel 52 display the default values selected during execution of the set-up module 30. The user may alter the default values during execution of the run module 40 by performing a mouse click on one of the line entries within one of the panels 50, 52. Performing a mouse click on the area denoted "RUN" in the application panel 52, for example, causes the communications application program to execute and put the communication evaluator program 22 in the background.

The Analyze panel 54 of the screen shown in FIG. 7 is used to perform one of three functions. By performing the mouse click on the instructions area 58 of the panel 54, a user may obtain instructions on how to utilize the functions available through the run module 40 and alter the parameters associated with the run module 40. By clicking on the file analysis area 60 of the Analyze panel 54, the user may select a function to determine information regarding the transmission of a selected file. Such information includes the financial charge or cost and length of time associated with the transmission of a particular data file (file analysis). Alternatively, a user may click on the diagnostics area 62 of the Analyze panel 54 to activate collection of diagnostic information regarding the data transmission of a selected file as it is performed by the selected communications application program (diagnostics).

Figure 8:
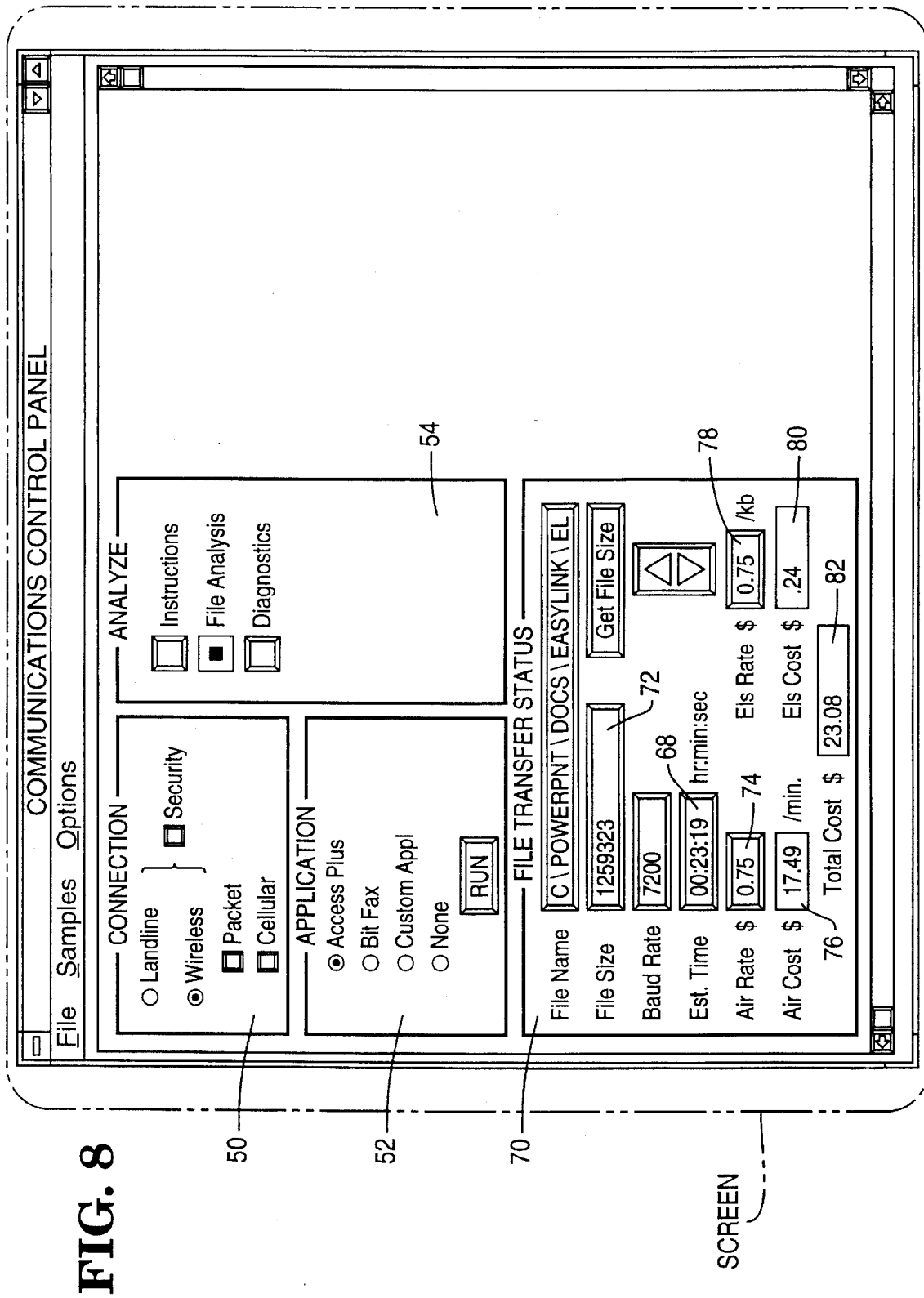
FIG. 8 is a depiction of a screen displayed in the preferred embodiment of the file analysis function of the run module of a program that implements the method of the present invention.

The panel associated with the file analysis function of the Analyze panel 54 is shown in FIG. 8. The file transfer status panel 70 permits a user to identify a file for data transmission in the input window associated with the variable FILE NAME. By clicking on the "GET FILE SIZE" area of the panel 70, a user causes the run module to obtain the file size, preferably in bytes, from the operating system and display that file size in the FILE SIZE window 72. The data transmission rate is displayed in the BAUD RATE window of the panel 70. Initially, the default values selected by the user during execution of the set-up module are displayed therein. By performing mouse clicks on either the up arrow or down arrow within panel 70, the user may selectively alter the data transmission rate.

The run module of the preferred embodiment of program 22 automatically estimates, and displays in window 68, the time for transmitting the data file defined in the FILE NAME window of panel 70 by using the displayed BAUD RATE and FILE SIZE parameters. The AIR RATE window 74 displays the financial charge per unit of time associated with the device either selected during execution of the set-up module or selected by the user using the connection panel 50 of the run module 40. The estimated time of transmission and air rate are used to calculate the AIR COST displayed in window 76. The financial costs of transmitting the file per unit of data through the selected transmission device is displayed in the ELS RATE window 78. The ELS RATE and FILE SIZE parameters are used to calculate an ELS cost, displayed in window 80, which is added to the AIR COST to generate a TOTAL COST which is displayed in window 82.

By reviewing the calculations within the Analyze panel 54, a user receives information that includes an estimate of the length of time to transmit a selected data file and the financial charge or cost for transmitting the data file through a particular external data device at a particular baud rate. By selecting other transmission devices or other baud rates, a user may obtain the charge and time information for transmission of the selected data file by other means. In this manner, the user can evaluate the most time or cost efficient manner for transmitting a file. For instance, the user may be in an airport with ten minutes prior to boarding. By using the file analysis function of the Analyze panel 54, the user can determine which communication method will transmit a selected file within the time remaining before boarding the user's flight. In other situations where time is not of the essence, the user may select a method which is most efficient in terms of its associated charge.

Figure 9:
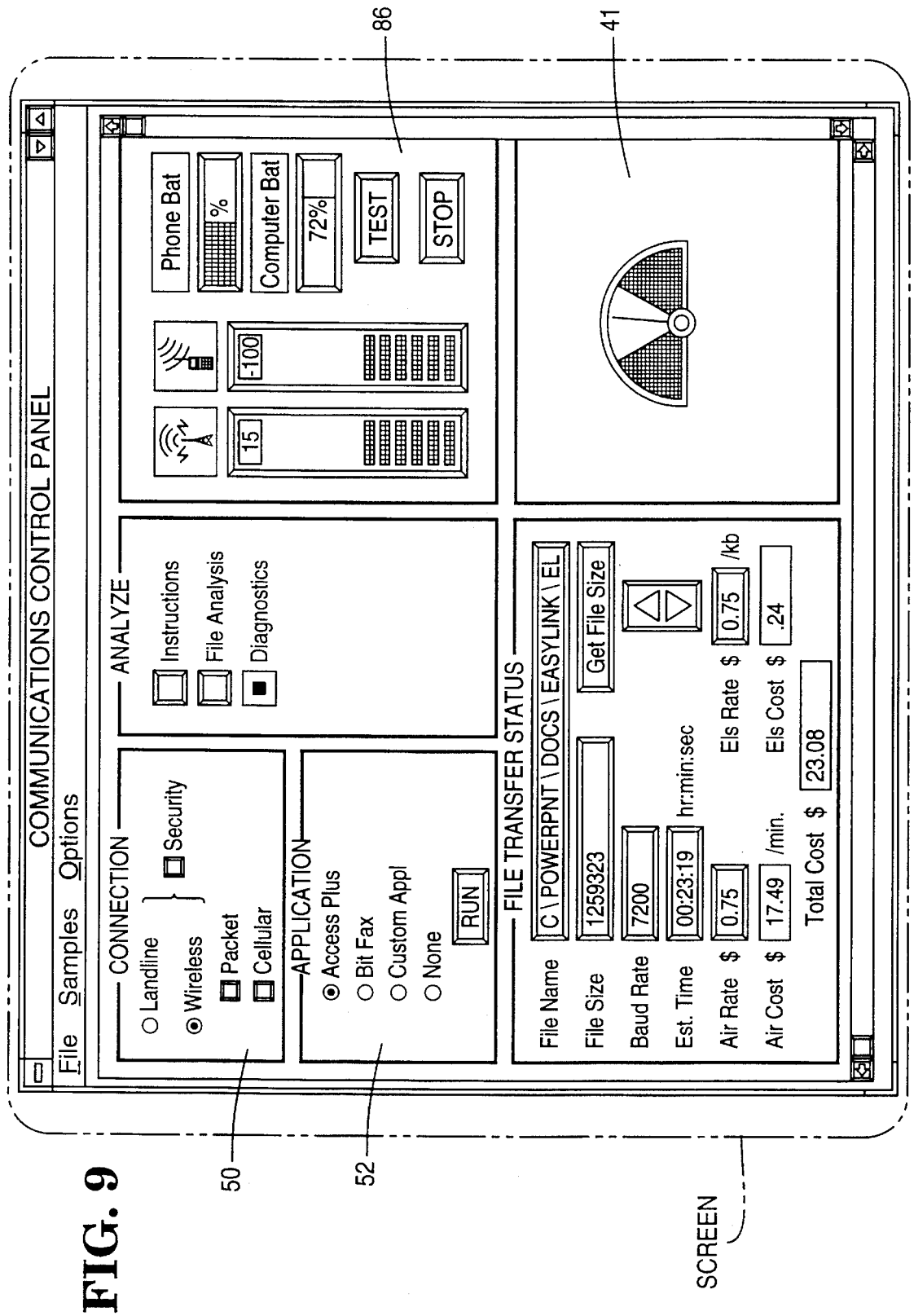
FIG. 9 is a depiction of a screen displayed in the preferred embodiment of the diagnostic function of the run module of a program that implements the method of the present invention.

By clicking on the diagnostic function on the Analyze panel 54, the user obtains a display of diagnostic information such as that shown in the screen of FIG. 9. Panel 86 provides a graphic indication of the remaining battery capacity of a selected external transmission device and the personal computer 12. For example, in FIG. 9, the battery strength of a cellular telephone is shown. By reviewing this indicator, a user may determine whether the phone has adequate power to support a data transmission for the estimated time depicted in window 68 (See FIG. 8). Likewise, the user may evaluate whether the computer 12 has sufficient power to operate for the estimated transmission time.

The diagnostic information provided in panel 86 also graphically depicts the strength of the transmitted signal and the strength of a received signal. By reviewing this information, a user may determine that a particular wireless method of transmission is insufficient to effectively transfer the selected data file and instead, decide to use a PSTN phone line. Clicking on the TEST area of panel 86 activates the diagnostic indicators so they are updated with status information from the hardware. Clicking on the STOP area freezes the indicators.

In the lower right panel 41, a display of a computed signal-to-noise ratio is displayed to further assist the user in evaluating whether the wireless method of communication is effective or not. This signal-to-noise ratio is computed from the received signal strength indicator (RSSI) that is obtained from a cellular telephone as discussed below.

Once a user has selected a particular transmission device, the user clicks on the run area in the application panel 52 to initiate the communications application program that controls the transmission of the selected data file through the modem 14 and the selected transmission device. During this communication process, the run module 40 continues to update the diagnostic information and monitor the communication process for the actual time of transmission and amount of data transmitted. This information is used to compute an actual charge associated with the transmission that may be stored in the receive or transmit log.

The communication evaluator program 22 receives signals generated by the hardware of the personal computer 12, the modem 14, and the selected external transmission device. In the preferred embodiment, the program 22 receives the real time clock and battery strength signals from the personal computer 12. These signals are used by the diagnostic function of run module 40 to display some of the diagnostic information shown in FIG. 9.

Program 22 also receives from the modem 14 status information regarding the serial communication between the computer and the modem. In the preferred embodiment, this information is obtained from polling the dual port RAM of the modem 14. Alternatively, the computer may monitor the AT command set messages transferred between the modem and computer over the serial communication line between them. The transmission progress information obtained from the modem of the preferred embodiment is shown in Table 1.

TABLE I

| TRANSMISSION PROGRESS STATUS VALUE | DESCRIPTION |
| --- | --- |
| 0 | Idle |
| 1 | Incoming Ring |
| 2 | Dialing |
| 3 | Ring Back |
| 4 | Training |
| 5 | Error Control Negotiation |
| 6 | Connected |
| 7 | Retrain |

With further reference to the signals of Table 1, the idle state indicates the modem is off-line. The incoming-ring state is used to indicate a data transmission is being received and generates an interrupt for the communication program. The dialing state indicates that a cellular voice channel is being connected through the modem. The training state begins at the start of an answer tone and ends when the modem within the connected external transmission device is successfully trained or synchronized with modem 14. If the modem 14 loses training with the external device modem, it attempts to retrain with that modem. If it is successful, the retrained state is written into the status byte. This value should be acknowledged by program 22 and the status byte in the dual port RAM is rewritten to state 6 to indicate a connected status.

The signals indicative of disconnect information received by program 22 from modem 14 of the preferred embodiment are shown in Table 2.

TABLE 2

| DISCONNECT INFORMATION VALUE | DESCRIPTION |
| --- | --- |
| 0 | Power-Up |
| 1 | Disconnect |
| 2 | DTE Commanded Disconnect |
| 3 | Telco Commanded Disconnect |
| 4 | Remote Modem Commanded Disconnect |
| 5 | Long Space Disconnect From Remote Modem |
| 6 | Time-Out |
| 7 | Bad Connection Disconnect |
| 8 | Remote Modem Carrier Lost |
| 9 | No Remote Modem Answer |
| 12 | No Modem Train |
| 13 | No Modem Negotiated |
| 14 | Error Control |
| 14 | No Cellular Service Or Logic Channel |
| 15 | Busy |
| 16 | No Dial Tone |

In further detail, Disconnect Information Value 2 (DTE Commanded Disconnect) indicates that a DTR or ATH signal was generated. The disconnect information value 9 is typically generated by an error condition resulting from dialing an incorrect number or connecting to a remote site modem not properly set-up to answer. The values resulting from these conditions may include another value, e.g., 10, if no ring back from the remote modem was detected and another value, e.g., 11, to indicate no answer tone even though a ring back was detected. Disconnect value 13 that indicates the modems failed to negotiate error control may be further refined to include two values. One value is caused, in the preferred embodiment, by one modem being MNP-only while the other is LAPM-only (i.e., the protocols of the respective modems are incompatible) or a cellular channel problem. Similarly, disconnect information value 14 may be caused by one of four conditions—no available control channel, no available voice circuit, a weak voice channel or a noisy voice channel. Currently, the preferred embodiment is capable of distinguishing between these conditions only by evaluating the RSSI value. If the RSSI value indicates a strong received signal then a control channel is available and the voice channel is probably not weak or noisy.

The preferred embodiment of program 22 also receives information from a cellular telephone such as an NEC P110/P120 and AT&T 3610. This type of information is passed from the phone to the modem 14. This information includes the telephone battery level, and RSSI from the telephone. Other information available in the dual port RAM of the modem 14 is a transmit counter value and a received count value. The transmit counter contains the number of bytes transmitted to the modem 14 from the phone and the received counter indicates the number of bytes transmitted by the modem 14 to the phone. Further information contained with the dual port RAM of the modem 14 in the preferred embodiment includes the hardware identification and software revision level as well as the connection type of the telephone.

The dual port RAM of the modem 14 of the preferred embodiment also contains error control information. This information includes the number of I-frames transmitted and the number of I-frames retransmitted. In the preferred embodiment of the invention, the I-frames retransmitted counter increments by one when a selective reject (SREJ) is generated.

While the present invention has been illustrated by the description of a preferred embodiment, and while the embodiment has been described in considerable detail, it is not the intention of the applicant to restrict or in anyway limit the scope of the appended claims to such detail. Additional advantages and modifications will readily appear to those skilled in the art. For example, other diagnostic information may be created from the data received from the external device to assist a user in evaluating a communication channel. The invention in its broadest aspects is therefore not limited to the specific details, representative apparatus and illustrative examples shown and described. Accordingly, departures may be made from such details without departing from the spirit or scope of applicant's general inventive concept.

What is claimed:

1. A method for evaluating efficiency of a transmission of a data file through a first transmission device, comprising:

selecting the first transmission device;

selecting the data file for transmission;

determining information about the transmission of the data file through the first transmission device; and displaying the information determined in the determining step whereby a user may evaluate whether to transmit the data file through the first transmission device.

2. The method of claim 1, wherein the data file selecting step further comprises the step of:

selecting one of a land line, a cellular telephone, and a wireless communication device.

3. The method of claim 1, wherein said information determining step comprises the steps of:

retrieving parameters of the first transmission device;

retrieving parameters of the data file; and determining an estimated cost for the transmission of the data file through the transmission device based on the retrieved first transmission device parameters and the retrieved data file parameters.

4. The method of claim 1, wherein said information determining step comprises the steps of:

retrieving parameters of the first transmission device;

retrieving parameters of the data file; and determining an estimated time for the transmission of the data file through the transmission device based on the retrieved first transmission device parameters and the retrieved data file parameters.

5. The method of claim 3, wherein the step of retrieving parameters of the data file comprises the step of:

retrieving size information for the data file.

6. The method of claim 3, wherein the step of retrieving parameters of the first transmission device comprises the step of:

retrieving a data transfer rate and a cost for transmission per unit of data for the transmission device.

7. The method of claim 1, further comprising:

storing the information about the transmission of the data file through the first transmission device which was determined in the first transmission device determining step;

selecting a second transmission device;

determining information about the transmission of the data file through the second transmission device; and displaying the information about the transmission of the data file through the second transmission device which was determined in the second transmission device determining step.

8. The method of claim 7, further comprising:

storing the information about the transmission of the data file through the second transmission device which was determined in the second transmission device determining step;

selectively displaying (a) the information about the transmission of the data file through the first transmission device; and (b) the information about the transmission of the data file through the second transmission device, so as to facilitate the user's evaluation of the first and second transmission device.

9. The method of claim 1, further comprising:

generating transmission progress signals representing actual progress of the transmission of the data file through the first transmission device; and displaying transmission status of the transmission of the data file through the first transmission device in response to generation of the transmission progress signals.

10. The method of claim 1, further comprising:

retrieving a computer battery level retrieving a first transmission device battery level; and displaying the computer battery level and the first transmission device battery level.

11. The method of claim 8, further comprising the steps of:

retrieving received signal strength information regarding the transmission of the data file through the first transmission device;

determining a signal to noise ratio from the received signal strength information; and displaying the received signal strength information and the signal to noise ratio whereby the user may evaluate the effectiveness of the transmission through the first transmission device.

12. A method for evaluating a transmission setting of a computer which defines a set of parameters relating to a potential transmission of a data file from a location within a computer to a remote site, comprising the steps of:

selecting the transmission setting;

determining information regarding the potential transmission based on the transmission setting; and displaying the determined information.

13. The method of claim 12, wherein the transmission setting selecting step comprises the steps of:

selecting a transmission connection; and selecting a data transfer rate.

14. The method of claim 13, further comprising the step of selecting a connection cost rate.

15. The method of claim 13, wherein the transmission connection selecting step includes the step of choosing the transmission connection from the group consisting of a public switched telephone network, a cellular telephone, and a packet radio.

16. The method of claim 12, wherein:

said determining step includes the step of determining an estimated cost for the potential transmission; and said displaying step includes the step of displaying the estimated cost.

17. The method of claim 12, wherein:

said determining step includes the step of determining an estimated time for the potential transmission; and said displaying step includes the step of displaying the estimated time.

18. A system for evaluating the efficiency of transmission for a data file through a transmission device comprising:

an interface for coupling to a plurality of transmission devices;

storage for transmission transfer parameters for each of said transmission devices;

storage for a plurality of data files and data file parameters for each of said files;

means for selecting one of said transmission devices and retrieving said transfer parameters for said selected transmission device;

means for selecting one of said data files and said data file parameters for said selected data file; and means for determining first information from said transfer parameters and said data file parameters so that a user may determine whether to use said selected device for transmission of said data file.

19. The system of claim 18 further comprising:

storage for said first determined information; and means for selectively displaying one of said first determined information and a second determined information for transmission of said data file through a second selected transmission device.

20. The system of claim 18, further comprising:

means for indicating a battery capacity, said indicating means being responsive to a signal from said battery corresponding to a power level for said battery so that a user may determine that a battery supplied device has sufficient battery power to support transmission of said selected data file.

21. The system of claim 18, wherein said determining means includes means for determining a first cost from said transfer parameters and said data file parameters.

22. The system of claim 18, wherein said determining means includes means for determining a first time from said transfer parameters and said data file parameters.

* * * * *